US005621912A

United States Patent [19]
Borruso et al.

[11] Patent Number: 5,621,912
[45] Date of Patent: Apr. 15, 1997

[54] METHOD AND APPARATUS FOR ENABLING MONITORING OF GUESTS AND NATIVE OPERATING SYSTEMS

[75] Inventors: Steven M. Borruso, Conklin; Steven M. Krol, Endwell, both of N.Y.

[73] Assignee: International Business Machines Corporation, Armonk, N.Y.

[21] Appl. No.: 366,279

[22] Filed: Dec. 29, 1994

[51] Int. Cl.$^6$ .................................................. G06F 11/30
[52] U.S. Cl. ........................................ 395/406; 395/620
[58] Field of Search ............................... 395/406, 700, 395/183.1, 650

[56] References Cited

U.S. PATENT DOCUMENTS

| | | | |
|---|---|---|---|
| 4,811,276 | 3/1989 | Suga | 395/183.1 |
| 4,855,936 | 8/1989 | Casey et al. | 395/118 |
| 5,010,481 | 4/1991 | Ishida | 395/497.02 |
| 5,193,180 | 3/1993 | Hastings | 395/183.11 |
| 5,230,069 | 7/1993 | Brelsford et al. | 395/406 |
| 5,237,684 | 8/1993 | Record et al. | 395/650 |
| 5,386,565 | 1/1995 | Tanaka et al. | 395/700 |
| 5,437,033 | 7/1995 | Inoue et al. | 395/700 |

*Primary Examiner*—Jack A. Lane
*Assistant Examiner*—Kevin Verbrugge
*Attorney, Agent, or Firm*—Baker, Maxham, Jester & Meador

[57] ABSTRACT

A virtual machine user gains access to the entire address space of another virtual machine operating system by storing and executing a machine code program in the other virtual machine that gives the monitoring machine user access to the desired data control structures in the target address space. This machine code program is executed in the target virtual machine after the initial program load (IPL) of an operating system in that virtual machine. In addition, access is gained to the execution space of the host operating system under which the monitoring virtual machine itself is supported by using system maintenance commands to set appropriate system operating parameters that permit viewing the control data structures of the host machine supporting the virtual machine user.

10 Claims, 8 Drawing Sheets

| X'023C' CODE | LENGTH CODE | FUNCTION VERSION |
|---|---|---|
| USER ID ||| 
| (IGNORED) |||
| (RESERVED) | TYPE FLAG | (RESERVED) |
| ASIT |||

*FIG. 6*

| X'240' CODE | FN. CODE | LENGTH CODE | FUNCTION VERSION |
|---|---|---|---|
| ASIT ||||
| ALET ||||
| ||||
| | TYPE FLAG | | |
| ||||

FIG. 7

METHOD AND APPARATUS FOR ENABLING MONITORING OF GUESTS AND NATIVE OPERATING SYSTEMS

BACKGROUND OF THE INVENTION

1. Field of the Invention

This invention relates generally to host operating systems that support multiple virtual machines and, more particularly, to monitoring the status of control data structures maintained both by host operating systems and guest operating systems or guest applications.

2. Description of the Related Art

Users communicate with a computer processor through an interface known as an operating system. Through the operating system, the users control the processor to manipulate data and initiate input and output operations. A set of address locations in memory of the processor defines the execution space under control of the operating system, which is where the operating system program code, system data, pointers to instruction addresses, control data structures, and the like are kept. Depending on the processor model and the operating system, a user can designate one or more virtual machines that will be supported by the operating system. The operating system will maintain a separate set of pointers, control data structures, and the like to support the activities of the virtual machine.

As an example, the International Business Machines Corporation ("IBM") operating system known as "Virtual Machine Enterprise Systems Architecture (VM/ESA)" supports multiple virtual machines. Each virtual machine is a functional equivalent to a real machine. Each of the virtual machines supported by the host processor is referred to as a "VM" and the underlying host processor operating system that manages the VM is generally referred to as a control program, or "CP" in the IBM nomenclature. It is the function of the CP to control operations in the host processing environment, including management of system resources, establishment of the virtual machine environment, and isolation of the various virtual machine owned storage areas from each other.

Main storage is allocated in extents known as absolute-storage address spaces, or simply address spaces. When a virtual machine is created by the host, an initial address space is provided for the virtual machine. This address space is known as the host-primary address space. The host operating system manages the virtual machines and the users such that a user running a virtual machine is restricted from gaining access to the address/data spaces of any other virtual machine. Initially, the host-primary address space is directly addressable only by the CPUs of the associated virtual machine. However, by using host services, the main storage (host-primary address space) of one virtual machine can be made directly addressable by the CPUs of another virtual machine. This shared main storage can be used to provide shared data for a collection of virtual machines executing on a single VM/ESA system.

Control of the host computer processor can be passed to a virtual machine whereby the user can interact through a virtual machine operating system interface that permits the user to manipulate data and initiate input and output operations. In this environment it appears to the user that it is executing on, and has full control of, the entire real processor complex. Thus, it is indistinguishable to the user whether it is conducting data operations in the execution space through the host computer or in the execution space of a virtual machine supported by the host computer. Thus the presence of multiple virtual machines supported by a single host computer processor is transparent to the users.

In a VM/ESA system, virtual machines can simulate the IBM System/370, 370-XA, ESA/370, and ESA/390 functions. In addition, on ESA/390 systems, an XC virtual machine architecture is available. An XC-mode virtual machine configuration contains all of the basic organizational elements defined for ESA/390 systems: main storage, one or more central processing units (CPUs), operator facilities, a channel subsystem, and I/O devices. In addition, an ESA/XC configuration has available additional separate absolute-storage address spaces, up to fifteen of which are concurrently addressable as provided by access-register addressing. These fifteen absolute-storage address spaces are selected from among a larger set as determined by a table called a host access list.

An access register contains an indirect specification of an absolute-storage address space. Each access register can designate any address space, including the instruction space (the host-primary address space) of the owning virtual machine or, if so permitted, another virtual machine. When one of the access registers is used to designate an address space, the CPU determines which address space is designated by translating the contents of the access register using host-managed tables.

An ESA/XC virtual machine has a host access list that specifies the set of address lo spaces, in addition to the virtual machine's host-primary address space, that are available to a CPU when it is in the access-register mode. The host access list contains a directory-specified number of host access-list entries, each of which either designates a particular address space or is considered unused. An access-list entry token (called an "ALET") corresponds to an address space of a VM. Through the use of host services, a host access-list-entry can be set to designate a particular address space or can be returned to the unused state.

A virtual machine host-primary address space can be loaded with and can execute, within the bounds of that virtual machine, another guest operating system. In a VM/ESA system, the CP supports an Initial Program Load "IPL" command through which a virtual machine user can o designate a guest operating system that will begin executing within the VM's host-primary address space. That is, a user running a VM can bring up a new operating system, thus the concept of running a guest operating system. Any user running on this new guest system can, in turn, bring up another operating system with yet additional VMs. In this way, the virtual machine environment permits many different operating systems to exist simultaneously and automatically provides independent operation to ensure data integrity and security.

When a VM is running a guest operating system, the host primary address space of that VM contains the numerous control data structures of the guest operating system used to support and maintain the running of the VMs executing on the new system. These control data structures include, for example, memory, hardware configuration information, program queues, input/output activity, counters that indicate relative position in operating queues, and the like. These are the same type of control and data structures that are being maintained by the host operating system that is supporting the VM that is running the new operating system.

It is convenient for a user having operational responsibility to run monitoring programs that retrieve the status of such control structures, thereby providing the user with the ability to check system performance and, if necessary, plan and implement changes in systems operations for greater efficiency or to validate that specific system control structures are being maintained correctly, possibly after an operating system code change has been made.

Typically, a system monitoring program that will retrieve the status of control data structures of an operating system, that is running in a VM, must run on the guest operating system running in that same VM. Unfortunately, the monitoring program itself usually has an influence on the system it is monitoring. That is, the monitoring program comprises an active program of the VM and will be associated with user identification data, the monitoring program will occupy locations in operating queues, and the monitoring program will compete for VM resources along with all the other programs being run by other users. In addition, the performance of the monitoring program itself is affected by the performance of the VM. For example, if the VM is heavily loaded and is operating relatively slowly, then the monitoring program also will operate relatively slowly. Thus, the performance and usefulness o of a monitoring program can be compromised by the requirement of running in the monitored VM. Another factor to be considered is that the monitor program must be written specifically to the interface of the guest operating system under test if it is to run on that system. Therefore, operating system-specific monitoring programs must be written and maintained.

It is known to gain access to the address/data space of another VM by using the access-list-entry token (ALET). As noted above, the ALET ordinarily specifies an address/data space associated with a VM. The ALET, however, also can be used to specify spaces associated with other VMs, thus a user can directly address another VM's address/data space. In this way, it is possible to monitor the operation of one virtual machine from another without affecting the operation of the monitored virtual machine. A method for obtaining such access is described, for example, in U.S. Pat. No. 5,230,069 to Brelsford et al., which is assigned to the assignee of this application and is incorporated herein by this reference.

If a VM user issues an IPL command to the CP to bring up another operating system, then the CP automatically revokes all access to any previously permitted spaces. That is, the storage that was previously accessible before the IPL command is no longer shared. Consequently, if a VM being monitored issues an IPL command, then the monitoring VM no longer has access to the data control structures of the operating system that are maintained in the host-primary address space of the VM who issued the IPL command. It should be noted that there is no supported conventional interface to establish, in the first place, a shared host-primary address space once the VM uses the IPL command to invoke another operating system such as VM/ESA.

In addition, the ALET scheme of gaining access to the address/data space of a VM does not support gaining access to the execution space of the host processor itself. The data structures defining the host processor execution space are maintained in the same manner as the data structures that define a VM's host-primary address space, but services are not provided for a user to access the host execution address space. It would be advantageous if a user running on a host processor could gain access to the execution space control data structures to perform a monitoring function of the host operating system.

From the discussion above, it should be apparent that there is a need for an apparatus and method that permits access and monitoring capability of control dam structure locations in a plurality of virtual machines from a given one of the virtual machines without substantially effecting the operation of the host computer or the virtual machine being monitored. It should also be apparent that there is a need to perform this same method of monitoring of the host operating system. The present invention satisfies these needs.

SUMMARY OF THE INVENTION

In accordance with the invention, a monitoring virtual machine gains access to guest operating system control and data structures by acquiring access to the entire execution space of another virtual machine that is running that guest operating system. This permits real-time, dynamic monitoring of system performance characteristics and provides system debug capabilities without effecting/influencing the operating system under test. The access is obtained after the guest operating system has been initialized and is running. Access also is gained to host operating system control and data structures under which the monitoring virtual machine itself is supported. This permits the same monitor program to be used for analyzing operating systems running both as a guest on VM/ESA or of the VM/ESA operating system itself running natively.

In one aspect of the invention the monitoring virtual machine makes use of an operating system facility allowing commands to be "sent" and executed at the command level of the target virtual machine that causes the target virtual machine to temporarily halt execution of the guest operating system and resume execution with a predetermined block of machine code that is advantageously stored in a portion of the target virtual machine execution space ordinarily reserved for maintenance functions. It is stored there using the same operating system facility as was used to send and execute commands at the target virtual machine. This block of machine code contains a diagnose instruction which when executed will grant access of the target virtual machine's primary address space to the monitoring virtual machine. Execution of the guest operating system is then restored allowing it to execute without knowledge that now the monitoring virtual machine can directly address and o monitor all storage that the guest operating system is executing in.

In another aspect of the invention, a virtual machine user can gain access to the execution space of the host processor operating system by issuing a privileged operating system command which will store an indicator, in the appropriate host operating system control structure, enabling the host execution address space to be directly addressable by virtual machines running on that system.

In both aspects of the invention, a virtual machine user can directly address, without requiring simulation by the operating system, operating system control and data structures which can then be manipulated/displayed and sampled again at a much faster rate than by previous means. Such monitoring presents a more accurate picture of system status and permits enhanced diagnosis of system operation and opportunities for greater system efficiency.

Other features and advantages of the present invention should be apparent from the following description of the preferred embodiment, which illustrates, by way of example, the principles of the invention.

BRIEF DESCRIPTION OF THE DRAWINGS

FIG. 6 is a representation of the data structure of the Diagnose X'23C' instruction issued by the VM A illustrated in FIG. 2.

FIG. 7 is a representation of the data structure of the Diagnose X'240' instruction issued by the VM A illustrated in FIG. 2.

DESCRIPTION OF THE PREFERRED EMBODIMENT

Figure 1:
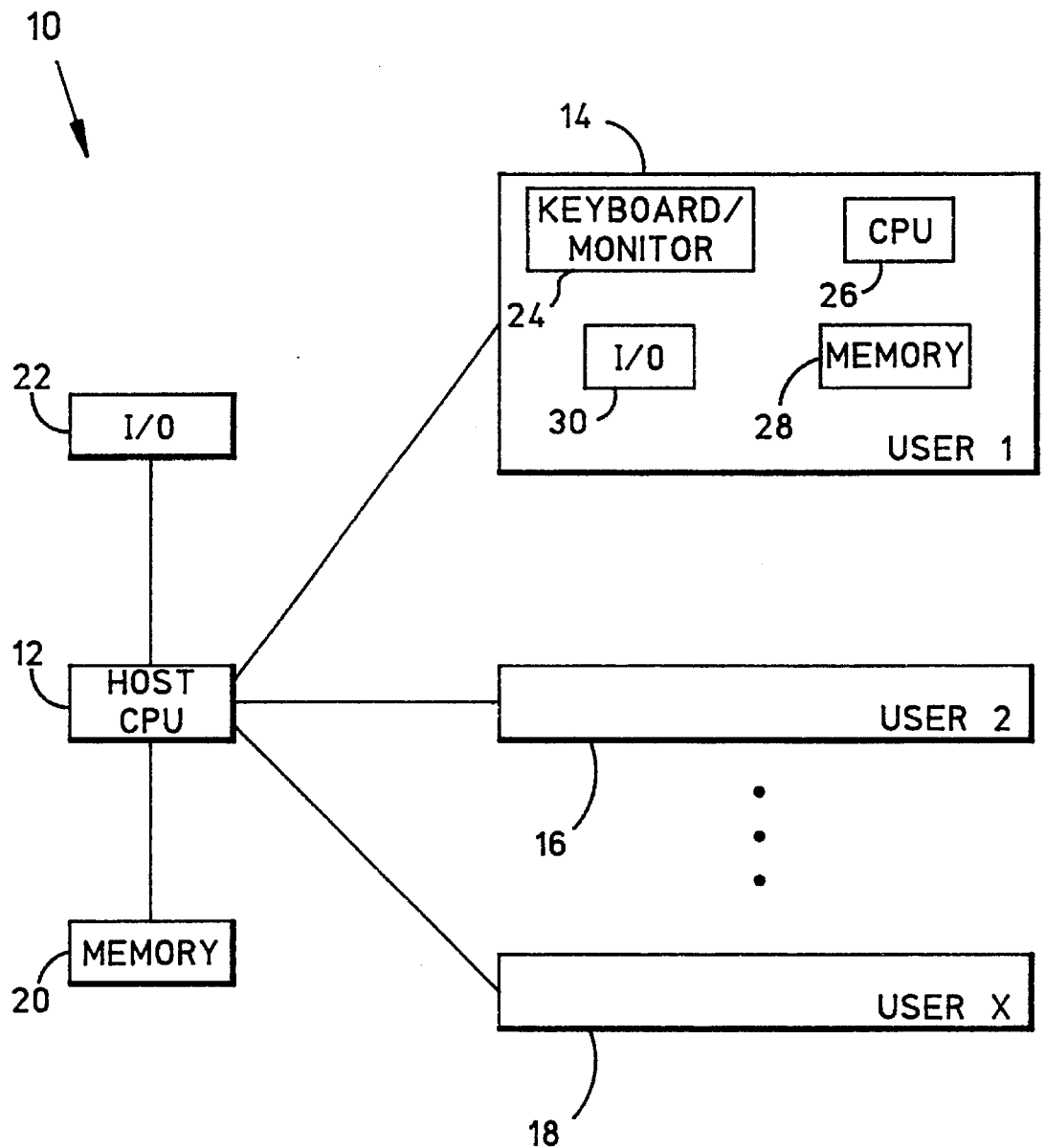
FIG. 1 is a block diagram of a computer system constructed in accordance with the present invention, illustrating the operating environment.
Figure 2:
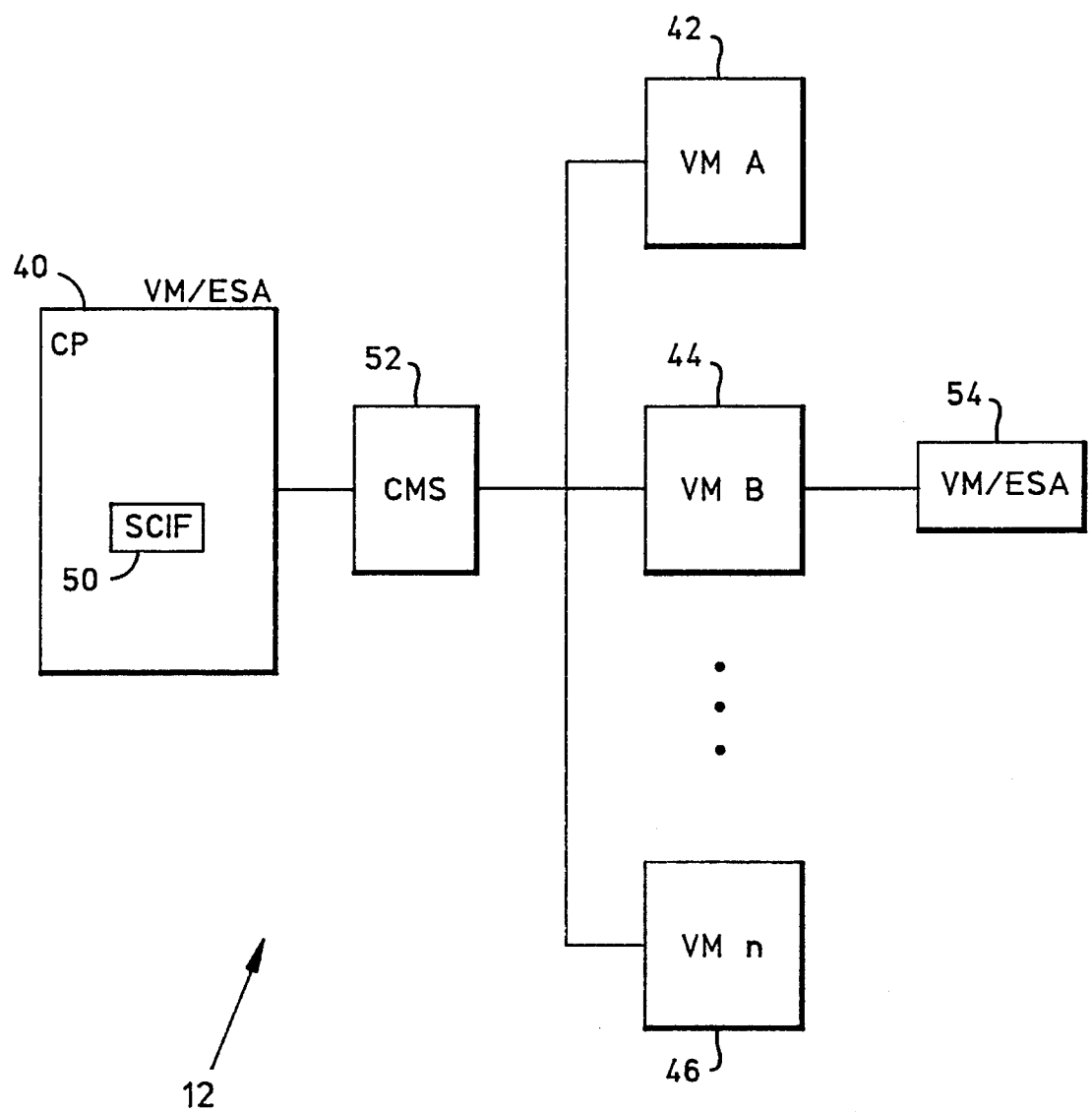
FIG. 2 is a block diagram that represents the various operational software elements managed by the host processor illustrated in FIG. 1.

FIG. 1 shows a computer system 10, constructed in accordance with the present invention, in which a host central processor unit (CPU) 12 communicates with a plurality of system users 14, 16, 18. Only three of the users have been illustrated for simplicity and ease of understanding. The host CPU is connected to a memory unit 20 and to one or more input/output (I/O) devices 22, such as video monitors, printers, plotters, and the like. The host CPU maintains various data structures within the memory unit that are allocated to an operating system and to each of the respective users. FIG. 1 shows the details of only one of the users 14 for simplicity and ease of understanding, but it should be understood that each of the other users 16, 18 connected to the host CPU includes similar structures. Each user includes a terminal keyboard/monitor 24 for communicating with the host CPU and optionally includes a CPU 26, a memory unit 28, and I/O devices 30. In the preferred embodiment, the host CPU 12 comprises a mainframe processor such as the processor system from International Business Machines Corporation ("IBM") known as "System/390" or "ESA/390". FIG. 2 illustrates the program routines and data paths that comprise the operating environment of the host CPU 12 within which the present invention can be applied. The host CPU supports an IBM operating system control program known as "CP" 40 that manages a virtual machine environment. When users log on to the system, virtual machines 42, 44, 46 are created that are managed by the host CPU and with which other users can communicate. The CP 40 facilitates communication between the host CPU, the users, the respective virtual machines, and applications programs (not illustrated). A software facility within CP known as the Single Console Image Facility (SCIF) 50 is used to set up the operating environment necessary for monitoring in accordance with the invention.

FIG. 2 shows the CP 40 communicating with the virtual machines designated VM A 42, VM B 44, and VM n 46 through an interactive software interface known as "CMS" 52. As noted above, the system users 14, 16, 18 (FIG. 1) can communicate with the host CPU 12 through one of the virtual machines 42, 44, 46 such that it appears to the user as if the respective virtual machine is a hardware processor and, in particular, is the host CPU. That is, it will be indistinguishable to the user whether communication is taking place with the host CPU through a relatively direct operating interface or through multiple layers of intervening interfaces such as CP, VM, and CMS.

Figure 3:
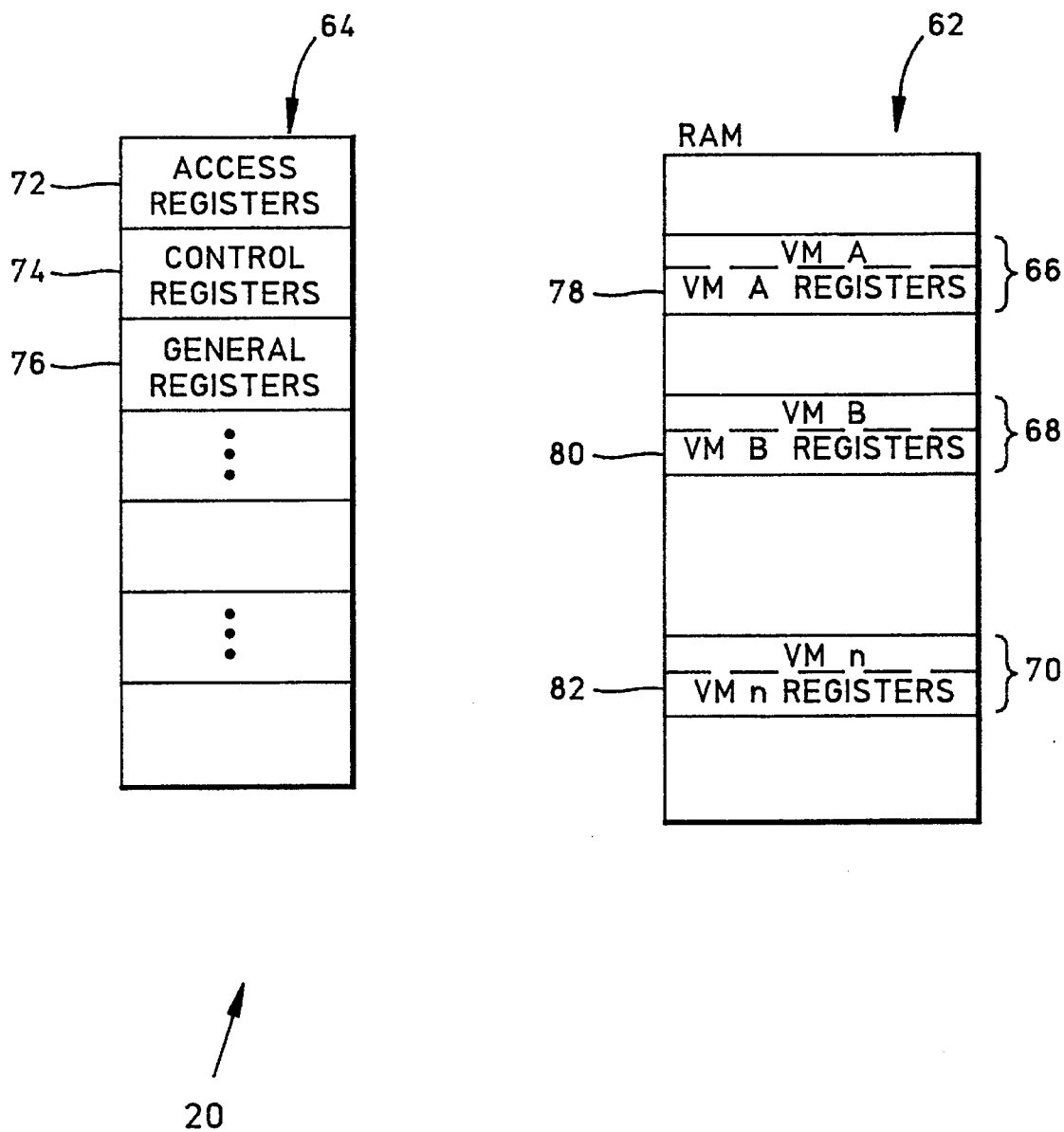
FIG. 3 is a representation of the address spaces in the host processor memory illustrated in FIG. 1.

FIG. 3 is a representation of the memory 20 of the host CPU 12 showing that, in the context of the virtual machine environment, the memory includes addressable storage locations 62 commonly referred to as random access memory (RAM) and a set of storage registers 64. The address locations of the RAM are used by the host CPU for temporary data storage and are also referred to as the absolute address space. Blocks of the RAM address locations are assigned to the virtual machines (FIG. 2) at the time of virtual machine creation. Each block of RAM assigned to a virtual machine is referred to as the host-primary address space of that virtual machine, also referred to simply as the base address space. Thus, FIG. 3 shows the RAM 62 subdivided into a VM A host-primary address space 66, a VM B host-primary address space 68, and a VM n host-primary address space 70. The blank RAM address areas between the assigned blocks illustrate that the address spaces are not necessarily contiguous and are understood to be usable as the host CPU requires.

The registers 64 include a set of hardware registers for use by the host CPU in carrying out its operations. These host CPU registers include a set of sixteen access registers 72, a set of control registers 74, and a set of general registers 76. The access registers are 32-bit registers that contain, among other information, data that specifies an address space to be used for data references. The address space can comprise a block of the RAM 62 or can comprise an external storage device, such as a disk drive (not illustrated). The control registers 74 are used for control of operations by the host CPU operating system. The general registers 76 are used for arithmetic computation and other temporary data storage in connection with application programs as well as address spaces to be used for data references.

As noted above, each virtual machine is the functional equivalent of the host CPU. Therefore, each virtual machine must have registers associated with it that duplicate the functions of the registers 72, 74, 76 provided for the host CPU. Thus, FIG. 3 shows that each VM in storage 62 includes addressable registers 78 assigned to VM A, registers 80 assigned to VM B, and so on for each VM through registers 82 assigned to VM n. Thus, the VM A registers include respective access registers 78a, control registers 78b, and general registers 78c, as do the VM B registers 80 and VM n registers 82. The virtual machine registers 78, 80, 82 are implemented as address space locations in the RAM 62 that comprise "virtual" registers within the respective VM's host-primary address space. In accordance with the VM/ESA operating environment, a user can utilize any one of the virtual machines 42, 44, 46 illustrated in FIG. 2 to invoke and support one or more guest operating systems by using the CP command "IPL".

In FIG. 2, a guest operating system 54 is indicated as being supported by VM B 44. When a guest operating system is invoked and supported by a host virtual machine, the CP 40 allocates a portion of the host-primary address space of the virtual machine to data structures related to the respective guest operating system. As users communicate through the guest operating system, these data structures are updated under control of the host virtual machine. The guest operating system can be any one of a number of systems, including a VM B copy of the CP program, such as a "VM/ESA" system. That is, the guest operating interface 54 presented to a user connected through VM B can appear to the user as identical to the CP 40 interface directly provided by the host CPU 12.

In accordance with the invention, if VM B 44 is to be monitored by VM A 42, then VM B first uses SCIF 50 to indicate that permission is granted for VM A to issue commands at VM B. When VM A wants to begin monitoring, it stores a block of machine code in the host CPU 12 memory base address space that is allocated to VM B for carrying out operations. VM A then points the VM B "processor" to the newly stored block of machine code. VM A forces the VM B processor to execute the newly stored block of machine code. Upon completion, VM B continues to execute what VM B was previously executing. VM A thereafter has access to the data structures in the VM B host-primary address space and such access is not reset or otherwise eliminated by VM B actions until another system reset occurs within VM B. Thus, a virtual machine user can monitor the data structures within a host CPU that have been allocated to a second virtual machine without adversely effecting the operation of the second virtual machine. In a similar fashion, a virtual machine user can monitor data structures within the host CPU that have been allocated to the very same host control program that manages the user, again without adversely effecting the operation of the host CPU being monitored.

The operational steps carried out in these monitoring functions will be better understood with reference to a pseudo code description, which is listed below. Terms used in the pseudo code will have the meanings listed below in Table 1:

TABLE 1

| Term | Meaning |
|---|---|
| CP | a control program running on a host machine system that in turn supports the running of one or more virtual machines |
| VM A | a first virtual machine supported by CP |
| VM B | a second virtual machine supported by CP |
| SCIF | an existing software facility (Single Console Image Facility) that permits user control of one or more virtual machines of other users; control is implemented through use of a CP SEND command from the controlling user |
| PSW | program status word=next Instruction address to be executed by a virtual machine |
| FE Patch Area | portion of the host processor or VM's "page zero" address space ordinarily reserved for maintenance functions provided by a service representative, such as a Field Engineer |
| ASIT | address space identification token that uniquely |

TABLE 1-continued

| Term | Meaning |
|---|---|
| | identifies a particular address space assigned by CP |
| UserID | name/location of a particular user connected to the operating system supported by a virtual machine |
| Class C | operator/user-type designation that identifies an operator who is designated a "System Programmer" and therefore is permitted to change system-wide parameters of a VM/ESA system |

These terms are used in the following section of pseudo code listed in Table 2, which describes the procedure for a user of one virtual machine to monitor the address space of 2o another virtual machine:

TABLE 2

| | |
|---|---|
| VM B | authorizes VM A as a secondary user via the CP "SET SECUSER" command (SCIF); |
| VM B | IPL's a guest system to be monitored (such as VM, MVS, VSE, etc.); |
| VM A | obtains VM B's Prefix Page address via the DISPLAY command through SCIF; |
| VM A | obtains VM B's Restart New PSW via the DISPLAY command through SCIF; |
| VM A | obtains VM B's ASIT associated with VM B's Host-Primary Address Space via the QUERY SPACE command through SCIF; |
| VM A | embeds the obtained Restart New PSW, ASIT, and the VM A UserID into a machine code program to be stored in VM B's prefix page (FE patch area) via the STORE command through SCIF; |
| VM A | stores the machine code program into the FE Patch Area in VM B's Prefix Page via the STORE command through SCIF; |
| VM A | stores into VM B's Restart New PSW the starting address of the machine code, previously stored in VM B's FE Patch Area, via the STORE command through SCIF; |
| VM A | causes a RESTART interrupt at VM B via the SYSTEM RESTART command through SCIF; |
| VM B | begins execution of the program previously stored in the FE Patch Area in response to the RESTART interrupt; |
| VM B | executes a Diagnose X'23C' (ADRSPACE PERMIT) as part of the stored machine code program, using the ASIT that describes VM B's Host-Primary Address Space and VM A's UserID (this action grants VM A permission to access VM B's Host-Primary Address Space); |
| VM B | restores the Restart New PSW with the original value that was obtained by VM A and stored in the machine code program; |

TABLE 2-continued

VM B    issues, as the last instruction in the stored machine code program, a Load PSW instruction from the Restart Old PSW which contains the next instruction that would have executed at the time of the RESTART interrupt, thereby resuming normal operation;

VM A    adds the ASIT of VM B's Host-Primary Address Space to VM A's Access List, maintained by CP, via a Diagnose X'240' (ALSERV ADD);

VM A    obtains the ALET that will be used to directly address VM B's Host-Primary Address Space by issuing the DISPLAY ACCLIST command;

VM A    executes an application program that performs manipulation of the accessed data;

END.

The pseudo code steps correspond to the boxes of the flow diagram illustrated in FIGS. 4 and 5, which will next be described.

Figure 4:
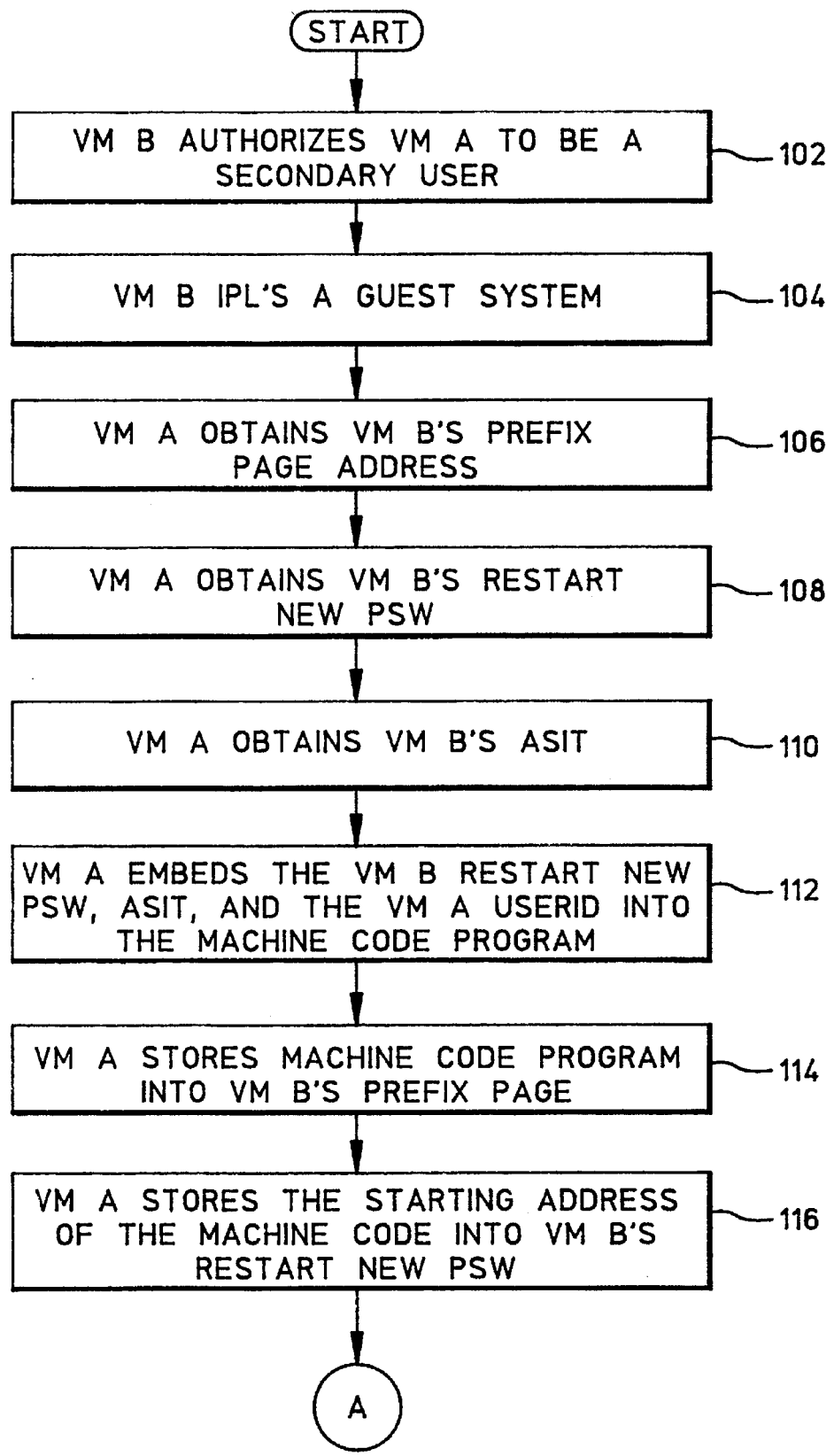
FIG. 4 and FIG. 5 are flow diagrams representing the processing steps executed by the host processor and virtual machines illustrated in FIG. 2 when a user of one virtual machine is to monitor the address space of another virtual machine.
Figure 5:
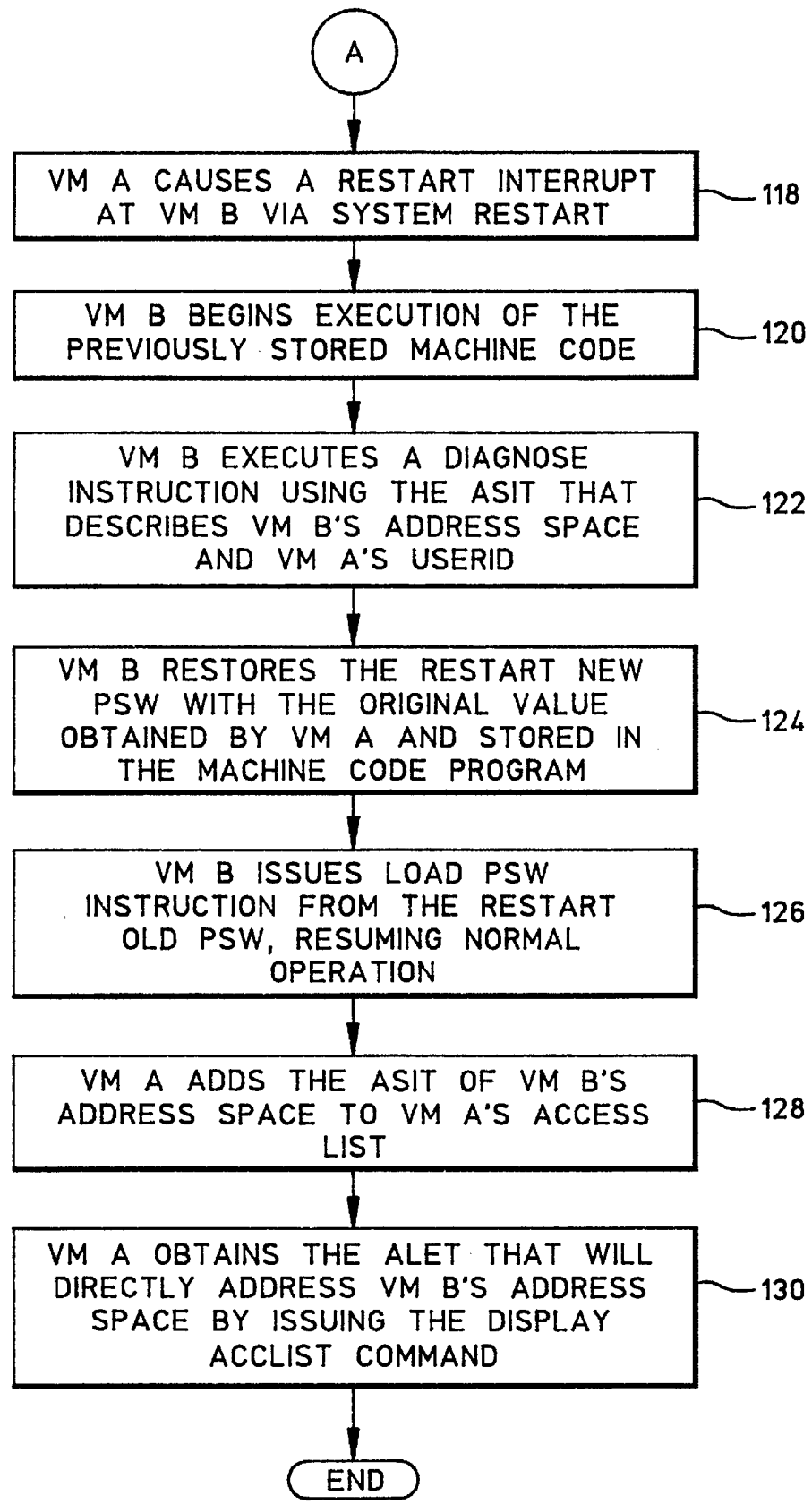

FIGS. 4 and 5 represent the processing steps carried out by the host CPU and the associated virtual machines and may be read in parallel with the pseudo code steps of Table 2. In the first step, corresponding to the FIG. 4 flow diagram box numbered 102, the virtual machine (VM B) to be monitored authorizes itself to be controlled by other virtual machines by designating them to be what are referred to as secondary users. In the IBM VM/ESA environment, this step comprises either a system user or VM B user with the proper authorization issuing a "SET SECUSER" command that will authorize a secondary user. Under CP, a secondary user is authorized to direct commands to other virtual machines. As described further below, this control is necessary to redirect the operations of VM B.

The next step, corresponding to the FIG. 4 flow diagram box numbered 104, is optional in the sense that the monitoring in accordance with the present invention will still be operational even if the step is not performed. The step comprises VM B invoking a guest operating system through the use of the IPL command. In the IBM VM/ESA environment, the IPL command causes what is known as a system reset, which eliminates any previous indication by VM B that external sharing of the host-primary address space is to be allowed. That is, conventionally, VM B can authorize sharing of its address space with other virtual machines, permitting monitoring, but the IPL command automatically removes such authorization. As noted above, any one of a number of guest operating systems can be invoked and supported by VM B, including the well-known IBM systems referred to as VM, MVS, VSE, and the like.

In the next step, corresponding to the flow diagram box numbered 106, VM A obtains what is referred to as VM B's prefix page address, again using the SCIF feature, this time with the DISPLAY command. The prefix page address is used to locate the FE patch area (defined above). This area is later used to store machine code that will enable the VM B host-primary address space to be shared. That is, the machine code stored in the VM B prefix page, when executed, will enable monitoring by VM A.

The next step illustrated in FIG. 4 (flow diagram box 108) and listed in the pseudo code is for VM A to obtain what is referred to as the "Restart New PSW" for VM B. In the IBM nomenclature, "PSW" refers to a program status word, which specifies the next instruction address to be executed by VM B after a Restart interrupt. The Restart New PSW is needed by VM A so VM A can restore VM B's Restart New PSW with the address of VM B's Restart New PSW interrupt handler.

The next step, corresponding to the FIG. 4 flow diagram box numbered 110, is for VM A to obtain what is referred to as the address-space-identification token (ASIT) for VM B's host-primary address space. In the IBM VM/ESA environment, the ASIT is an 8-byte token that uniquely identifies a particular address space assigned by the host CPU. Thus, this step comprises VM A learning the ASIT for the VM B host-primary address space. In the preferred embodiment described in the drawings, a user connected to VM A causes VM B to issue a "QUERY SPACE" command via SCIF to obtain the VM B ASIT associated with its host-primary address space.

As the next step, the VM A user embeds the Restart New PSW, ASIT, and the VM A user identification (UserID) into a enabling machine code program that is described more fully below. The step is illustrated in FIG. 4 as the flow diagram box numbered 112. The machine code is preferably retrieved from an area of the VM A address space, for insertion of the obtained VM B information (and VM A UserID), and temporarily stored in the VM A host-primary address space.

At the step illustrated as the FIG. 4 flow diagram box numbered 114, the VM A user stores the enabling machine code program into the VM B prefix page area, whose address was previously obtained, using the STORE command, again via SCIF. In particular, the machine code is stored into an area of the VM B prefix page referred to as the FE Patch area. As known to those skilled in the art, this area of the prefix page is ordinarily reserved for use by Field Engineering personnel or other persons who are authorized to perform system-wide maintenance programming. Persons likely to perform the monitoring function described in accordance with the present invention should be fully aware of the FE Patch area and how to address it without further explanation.

The next step to be performed, as illustrated by the next item of pseudo code and the FIG. 4 flow diagram box numbered 116, is for the VM A user to store the starting address of the enabling machine code into the Restart New PSW of VM B. The starting address of the machine code will be the first address location in the VM B FE Patch area in which the code was stored at box 114 above. In the IBM VM/ESA environment, the step of storing the starting address is accomplished using the STORE command via SCIF.

The next step to be performed is illustrated in the continuation of the flow diagram in FIG. 5. The FIG. 5 flow diagram box numbered 118 indicates that the next step is for the VM A user to cause a Restart interrupt at VM B by having CP issue a restart command on VM B. The VM A user initiates the RESTART interrupt by using the "SYSTEM RESTART" command via SCIF. At the FIG. 5 flow diagram box numbered 120 and in the next item of pseudo code, VM B responds to the interrupt by beginning execution of the enabling machine code program previously stored in the FE Patch area of the VM B host-primary address space. That is, VM B will go to its Restart New PSW to get the address of the next instruction to be executed, but the VM A user has previously stored the machine code address there, and therefore VM B will execute the machine code.

The next step, indicated by the flow diagram box numbered 122, is a step in the enabling machine code program that causes VM B to perform a permit-access diagnose instruction that authorizes VM A to have access to the VM B host-primary address space. In accordance with the preferred embodiment of the present invention, this is accomplished through the DIAGNOSE X'23C' instruction. In accordance with the present invention, the instruction is part of the machine code that can be manipulated by a user to obtain its functioning. It should be appreciated that a VM A user otherwise cannot externally monitor the address space of VM B. Because VM B is running an operating system, VM B cannot permit VM A to monitor the VM B address space. Thus, in accordance with the present invention, a VM A user can force VM B to permit monitoring of the VM B address space.

FIG. 6 illustrates the contents and form of the "DIAGNOSE" instruction. As illustrated therein, the permit-access function of the DIAGNOSE instruction is specified with the hexadecimal parameter code of 23C, a parameter list length code, a function-version code, the UserID of the virtual machine to be given access, either a read-only or read-write authorization code, and the ASIT that identifies the host-primary address space of VM B.

In the next item of pseudo code and in the next FIG. 5 flow diagram box numbered 124, the enable processing continues with the step of VM B restoring the Restart New PSW with the original value that was obtained by the VM A user and stored in the enabling machine code program. That is, the enabling machine code program includes a programming instruction that causes VM B to take this step. This step restores the original Restart New PSW, in the event of another restart interrupt.

In the next processing step, represented by the flow diagram box numbered 126 in FIG. 5, VM B processes the last instruction code contained in the enabling machine program, which causes VM B to issue a "LOAD PSW" instruction. Previously embedded in the machine code as the LOAD PSW parameter was the address of the next instruction to be executed by VM B at the time of the interrupt, which may be characterized as the "Restart Old PSW" of VM B. Thus, execution of the LOAD PSW instruction causes VM B to resume normal operation. In this way, users connected to VM B are substantially unaware that the monitoring function has been implemented and is ongoing.

The next processing step is illustrated in the FIG. 5 flow diagram box numbered 128 and comprises the VM A user adding the ASIT of the VM B host-primary address space to the VM A access list. As noted above, the CP of the host CPU maintains an access list for each virtual machine that specifies the address spaces to which that virtual machine is granted access. This step involves the VM A user who wishes to monitor VM B to add the VM B ASIT to the VM A access list. In accordance with the preferred embodiment of the present invention, this is accomplished through the DIAGNOSE X'240' instruction. This instruction is available to VM/ESA users executing in a ESA/XC mode virtual machine.

FIG. 7 illustrates the contents and form of the DIAGNOSE X'240' instruction. As illustrated therein, the add-access-list function of the DIAGNOSE instruction is specified with the hexadecimal parameter code of 240, a parameter list function code, a parameter list length code, a function-version code, the ASIT to be added, the ALET (supplied by CP) to reference the VM B address space, and either a read-only or read-write authorization code.

Finally, the last step in gaining access to the VM B address space is illustrated in the FIG. 5 flow diagram box numbered 130, which specifies that the VM A user wishing to gain access obtains the ALET obtained from the DIAGNOSE X'240' instruction that will be used to directly address the VM B host-primary address space. In the IBM VM/ESA environment, this step is performed by using a "DISPLAY ACCLIST" command issued to the CP of the host CPU. This ALET can then be used to directly address the VM B host-primary address space, thus, enabling the monitoring process to begin.

Included as the last item of the pseudo code (not illustrated in FIG. 5) is an application program to manipulate the data now made accessible to the VM A user. It should be understood that a variety of application programs can be used to manipulate, process, and otherwise operate on the VM B status information obtained by means of the processing steps described in conjunction with FIGS. 4 and 5, and that such application programs do not form a part of the access-gaining invention described herein. That is, the access method described herein exists separate and apart from any scheme to manipulate the data thereby obtained.

As noted above, in accordance with the present invention it is possible to a user to monitor the execution space of the host control program through which the user is supported. The procedure steps are listed in Table 3, which uses the terms defined in Table 1.

TABLE 3

VM A must be designated a "Class C" UserID supported by CP;
VM A obtains the address of the ASC block that describes the system execution address space of CP;
VM A issues a Store Host command through CP to enable a "public bit" and a "shared bit" in the ASC block that describes the system execution address space of CP, thereby permitting any CP-supported user to have access to to the system execution address space;
VM A adds CP's system execution address space into the VM A access list by using the Diagnose X '240' function;
VM A executes an application that performs manipulation of the accessed data;
END.

The pseudo code steps correspond to the boxes of the flow diagram illustrated in FIG. 8, which will next be described.

Figure 8:
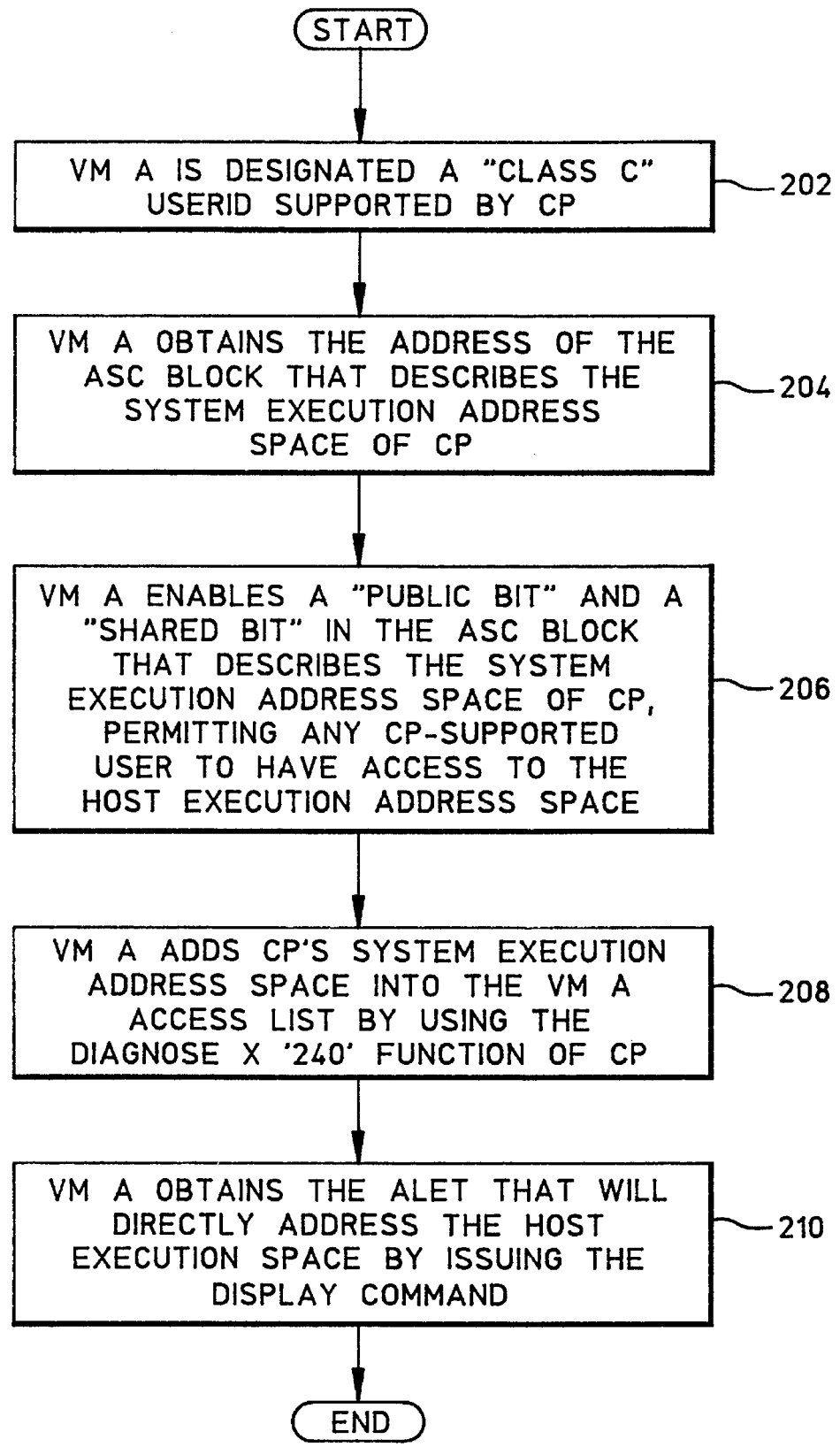
FIG. 8 is a flow diagram representing the processing steps executed by the host processor and virtual machines illustrated in FIG. 2 in permitting a virtual machine user to monitor the execution space of the host control program through which the user is supported.

FIG. 8 represents the processing steps carried out by the host CPU and the associated virtual machines and may be read in parallel with the pseudo code steps of Table 3. The first step, corresponding to the FIG. 8 flow diagram box numbered 202, comprises what is actually a preparatory step, which consists of ensuring that the VM A user to conduct the monitoring of the host CPU address space has been given authority to update the data structure necessary to perform the monitoring function. More particularly, in the IBM VM/ESA environment, the VM A user must be designated what is referred to as a "Class C" user. Each user connected to the host CPU by CP is associated with a UserID that identifies that user and the node connections, system parameters, and the like associated with that user. A Class C user has the authorizations necessary to perform the following processing steps.

In the next step, represented by the FIG. 8 flow diagram box numbered 204 and the next item of pseudo code, the VM A user who is to monitor the host CPU obtains the address of what is known as the Address-Space-Control (ASC) block of the host CPU address space. In particular, the portion of host CPU address space containing the control data structures to be monitored is referred to in the IBM nomenclature as the CP system execution address space. As known to those skilled in the art, the ASC block resides in a portion of the host CPU address space 62 of the memory 20 (FIG. 3).

The next step, represented by the FIG. 8 flow diagram box numbered 206 and next specified in the pseudo code, is for the VM A user to enable the parameters in the ASC block ("shared" bit and "public" bit) that permit any CP-supported user to have access to the system execution address space. In the IBM VM/ESA environment, the step of enabling access is accomplished using the "STORE HOST" command of CP. As noted above, in the IBM VM/ESA environment, this command is reserved for IBM system programmer use. Although the command is not ordinarily accessible by users, in accordance with the present invention, the VM A user who is to monitor the execution space has the designation of a "Class C" programmer and therefore is entitled to directly use the command and engage in the monitoring function. Those skilled in the art will recognize that the "ASCSTATE" field in the ASC block comprises the "ASCPUBLC" and "ASCSHARE" bits of the ASC block, located within the ASCSTATE portion at a current ASC block hexadecimal displacement location of 64.

At the last of the processing steps, described in the next item of pseudo code and represented by the flow diagram box numbered 208 in FIG. 8, the VM A user adds the CP system execution address space into the associated VM A access list by using the DIAGNOSE X'240' function of CP.

Finally, the last step in monitoring the host execution space is illustrated in the FIG. 8 flow diagram box numbered 210, which specifies that the VM A user wishing to monitor the host execution space obtains the ALET obtained from the DIAGNOSE X'240' instruction that will be used to directly address the host execution address space. In the IBM VM/ESA environment, this step is performed by using a DISPLAY ACCLIST command issued to the CP of the host CPU. This ALET can then be used to directly address the host execution address space, thus, enabling the monitoring process to begin.

Included as the last item of the pseudo code (not illustrated in FIG. 8) is an application program to manipulate the data now made accessible to the VM A user. It should be understood that a variety of application programs can be used to manipulate, process, and otherwise operate on the host CPU status information obtained by means of the processing steps described in conjunction with FIG. 8, and that such application programs do not form a part of the access-gaining invention described herein. That is, the access method described herein exists separate and apart from any scheme to manipulate the data thereby obtained.

Thus, in accordance with the present invention, a virtual machine user can gain access to the execution space of a host processor by using a system maintenance command to set appropriate system operating parameters that permit viewing the control data structures of the host machine supporting the virtual machine user. Such monitoring is achieved without adversely affecting the operation of the monitored host operating system. Moreover, a virtual machine user also gains access to the entire execution space of another virtual machine by remotely storing, then forcing the execution of, a machine code program in the target virtual machine's host-primary address space. This gives the monitoring virtual machine continuous access to the desired data control structures existing in the target virtual machine host-primary address space after the virtual machine being monitored executes an IPL command that otherwise resets all permitted data space access. The target virtual machine is monitored without adversely affecting operation of the virtual machine processor.

The present invention has been described above in terms of a presently preferred embodiment so that an understanding of the present invention can be conveyed. There are, however, many configurations for host computing systems not specifically described herein but with which the present invention is applicable. The present invention should therefore not be seen as limited to the particular embodiment described herein, but rather, it should be understood that the present invention has wide applicability with respect to host computing systems generally. All modifications, variations, or equivalent arrangements that are within the scope of the attached claims should therefore be considered to be within the scope of the invention.

We claim:

1. A method of providing a first virtual machine guest, emulated in a first host-primary address space by a control program in an execution address space of a host computer, with access to a second host-primary address space of at least one additional second virtual machine guest emulated by the control program, the method comprising the steps of:

providing the control program with an authorization from the second virtual machine guest for commands to be received and executed by the second virtual machine guest sent from the first virtual machine guest;

locating an external address space identification token associated with the hostprimary address space of the second virtual machine guest;

retrieving a restart new instruction word address of the second virtual machine guest;

storing the restart new instruction word address, external address space identification token, and a UserID of the first virtual machine guest along with a diagnose instruction that authorizes the first virtual machine guest to have access to the host-primary address space of the second virtual machine guest in a machine code program;

storing the machine code program in a predetermined FE patch portion of the second virtual machine guest host-primary address space;

replacing the restart new instruction word address of the second virtual machine guest with the starting instruction address of the machine code program in the predetermined FE patch portion of the second virtual machine's host-primary address space;

issuing a restart interrupt command from the control program that causes the second virtual machine guest to begin executing the machine code program residing in the FE patch portion of the second virtual machine guest host-primary address space;

resuming normal operation of the second virtual machine guest by returning to the restart old instruction word address saved when the second virtual machine guest was initially interrupted; and adding the host-primary address space of the second virtual machine guest to an access list for the first virtual machine guest that is maintained by the host computer, thereby providing access by the first virtual machine guest to the host-primary address space of the second virtual machine guest.

2. A method as defined in claim 1, wherein the step of storing the machine code program code includes storing a DIAGNOSE Permit-Access function of the control program, thereby granting the first virtual machine guest access to the second virtual machine's host-primary address space.

3. A method as defined in claim 1, wherein the first virtual machine executes a DIAGNOSE Access-List-ADD function of the control program, thereby adding the second virtual machine's host-primary address space to the access list of the first virtual machine guest.

4. A method of providing a virtual machine guest, emulated by a control program of a host computer in a host-primary address space and communicating with one or more computer users, with access to an execution address space in memory of the host computer, the method comprising the steps of:

designating the virtual machine guest computer user as a class of operator that the host computer will recognize as being entitled to a special field support level of operation;

enabling a public and a shared bit flag stored in a block of the host computer memory that permits access to the execution address space of the host computer, thereby permitting any virtual machine to have access to the host computer execution address space; and adding the execution address space of the host computer into an access list of the virtual machine guest.

5. A method of providing a virtual machine guest, emulated by a control program of a host computer in a host-primary address space and communicating with one or more computer users, with access to an execution address space in memory of the host computer, the method comprising the steps of:

designating the virtual machine guest computer user as a class of operator that the host computer will recognize as being entitled to a special field support level of operation;

enabling a public and a shared bit flag stored in a block of the host computer memory that permits access to the execution address space of the host computer, thereby permitting any virtual machine to have access to the host computer execution address space; and adding the execution address space of the host computer into an access list of the virtual machine guest;

wherein the step of enabling the public and shared bits flag comprises issuing a STORE HOST command by the virtual machine guest that the host computer will recognize as enabling the public and shared bits flag.

6. A method of providing a virtual machine guest, emulated by a control program of a host computer in a host-primary address space and communicating with one or more computer users, with access to an execution address space in memory of the host computer, the method comprising the steps of:

designating the virtual machine guest computer user as a class of operator that the host computer will recognize as being entitled to a special field support level of operation;

enabling a public and a shared bit flag stored in a block of the host computer memory that permits access to the execution address space of the host computer, thereby permitting any virtual machine to have access to the host computer execution address space; and adding the execution address space of the host computer into an access list of the virtual machine guest:

wherein the step of adding the execution address space comprises issuing a DIAGNOSE X'240' function by the virtual machine guest that the host computer will recognize as adding the host computer execution address space to the access list of the virtual machine guest.

7. An apparatus for providing a first virtual machine guest emulated in a first host-primary address space by a control program in an execution address space of a host computer with access to a second host-primary address space of at least one additional second virtual machine guest emulated by the control program, the apparatus comprising:

a control facility that receives commands from the first and second virtual machine guests and responds by causing the control program to execute associated operations, including receiving a store command from the first virtual machine guest and causing the storing of a restart new instruction word address, external address space identification token, and a UserID of the first virtual machine guest, along with a function that authorizes the first virtual machine guest to have access to the host-primary address space of the second virtual machine guest, in a predetermined FE patch portion of the second virtual machine guest host-primary address space, receiving a store command from the first virtual machine guest and replacing the restart new instruction word address of the second virtual machine guest with the starting instruction address of a machine code monitoring program code in the predetermined FE patch portion of the second host-primary address space, receiving a restart interrupt command from the first virtual machine guest and causing the second virtual machine guest to begin executing the machine code monitoring program code residing in the FE patch portion of the second virtual machine guest host-primary address space, and executing a Load PSW instruction stored in the machine code program code and causing normal operation of the second virtual machine guest to resume by returning to a restart old instruction word address that was saved by an interrupt processor of the operating system when the second virtual machine guest was initially interrupted;

permit control means for providing the control program with an authorization from the second virtual machine guest for external commands to be received by the second virtual machine guest from the first virtual machine guest; and an access list maintained by the control program that identifies for each virtual machine guest one or more address space blocks to which the virtual machine guest will be permitted access such that the host-primary address space of the second virtual machine guest can be added to an access list for the first virtual machine guest, thereby providing access by the first virtual machine guest to the host-primary address space of the second virtual machine guest.

8. An apparatus as defined in claim 7, wherein the machine code monitoring program code includes a DIAGNOSE Permit-Access function that is executed by the control facility, thereby granting the first virtual machine guest access to the second host-primary address space.

9. An apparatus as defined in claim 7, wherein the first virtual machine executes a DIAGNOSE Access-List-ADD function of the control program, thereby adding the second virtual machine's host-primary address space to the access list of the first virtual machine guest.

10. An apparatus for providing a virtual machine guest, emulated by a control program of a host computer in a host-primary address space and communicating with one or more computer users, with access to an execution address space in memory of the host computer, the apparatus comprising:

class means for designating the virtual machine guest computer user as a class of operator that the host computer will recognize as being entitled to a special field support level of operation;

an access list maintained by the control program that identifies for each virtual machine guest one or more address space blocks to which the virtual machine guest will be permitted access;

a control facility that receives commands from the virtual machine guest computer user and responds by causing the control program to execute associated operations, including receiving a STORE HOST command from the virtual machine guest computer user and responding by enabling public bit and shared bit flags stored in a block of the host computer memory that permit access to the execution address space of the host computer, thereby permitting any computer user to have access to the host computer execution address space, and receiving a DIAGNOSE function from the virtual machine guest computer user and responding by adding the execution address space of the host computer into the access list of the virtual machine guest.

* * * * *